US011809579B2

(12) United States Patent
MacAndrew et al.

(10) Patent No.: US 11,809,579 B2
(45) Date of Patent: Nov. 7, 2023

(54) METHOD AND SYSTEM FOR CONFIGURATION VALIDATION

(71) Applicant: JPMorgan Chase Bank, N.A., New York, NY (US)

(72) Inventors: Robert MacAndrew, Glasgow (GB); Miklos Kalman, Glasgow (GB); Joel Klein, Croton, NY (US); Remya Gangadharan, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 395 days.

(21) Appl. No.: 17/065,076

(22) Filed: Oct. 7, 2020

(65) Prior Publication Data

US 2022/0108029 A1 Apr. 7, 2022

(51) Int. Cl.
| | |
|---|---|
| *G06F 21/00* | (2013.01) |
| *G06F 21/60* | (2013.01) |
| *G06F 21/31* | (2013.01) |
| *H04L 67/10* | (2022.01) |
| *G06Q 30/018* | (2023.01) |
| *G06Q 10/10* | (2023.01) |
| *G06F 9/445* | (2018.01) |

(52) U.S. Cl.
CPC ........ *G06F 21/604* (2013.01); *G06F 9/44505* (2013.01); *G06F 21/31* (2013.01); *G06Q 10/10* (2013.01); *G06Q 30/0185* (2013.01); *H04L 67/10* (2013.01)

(58) Field of Classification Search
CPC .... G06F 21/604; G06F 9/44505; G06F 21/31; G06F 21/10; G06Q 10/10; G06Q 30/0185; H04L 67/10
See application file for complete search history.

(56) References Cited

U.S. PATENT DOCUMENTS

| | | | | |
|---|---|---|---|---|
| 11,128,529 | B1* | 9/2021 | Kancharla | H04L 67/10 |
| 2012/0179907 | A1* | 7/2012 | Byrd | H04L 9/3268 |
| | | | | 713/156 |
| 2016/0042285 | A1* | 2/2016 | Gilenson | G06F 8/70 |
| | | | | 706/47 |
| 2016/0063184 | A1* | 3/2016 | Hau | G16H 70/20 |
| | | | | 705/3 |
| 2018/0373578 | A1* | 12/2018 | Bridges | G06N 20/00 |
| 2020/0162330 | A1* | 5/2020 | Vadapalli | H04L 63/0892 |
| 2020/0241865 | A1* | 7/2020 | Phong | G06F 8/71 |
| 2021/0279079 | A1* | 9/2021 | Shrivastava | G06F 9/45529 |
| 2022/0019420 | A1* | 1/2022 | Gustie | G06F 11/3608 |

* cited by examiner

*Primary Examiner* — Kendall Dolly

(74) *Attorney, Agent, or Firm* — GREENBLUM & BERNSTEIN, P.L.C.

(57) ABSTRACT

A method and a system for validating a proposed change to a configuration of an application are provided. The method includes: receiving a user request for changing a setting of one or more parameters of the configuration of the application; retrieving, from a memory, a set of rules that relate to permissible settings for the parameters; comparing the request to the retrieved rules; determining whether the request is acceptable based on a result of the comparison; and when the request is determined as being acceptable, validating the request. The rules may be applicable across an entirety of an organization or specific to a particular line of business. The parameters may relate to report formats or digital dashboards that are generated by executing the application.

16 Claims, 4 Drawing Sheets

METHOD AND SYSTEM FOR CONFIGURATION VALIDATION

BACKGROUND

1. Field of the Disclosure

This technology generally relates to methods and systems for validating a configuration of a software tool, and more particularly, to methods and systems for performing an automated scan and validation of a software configuration that is undergoing changes in order to verify that the changes conform to applicable policies, procedures, and rules.

2. Background Information

For many software applications that are designed as business intelligence tools, a user may have an objective that entails performing a specific analysis function. In many instances, it may be relatively easy for the user to configure the software to perform the desired analysis.

However, when the software application is included as part of a suite of applications that are used within an organization such as a corporation or other commercial entity, the organization may have policies, procedures, and rules with respect to proposed configuration changes for any software application within the suite. Further, for a relatively large organization, there may be additional policies, procedures, and rules that are applicable within a specific section of the organization, such as a department or a line of business (LOB).

Accordingly, there is a need for an automated method for validating configuration changes to software, in order to ensure that the changes conform with organizational rules, policies, and procedures.

SUMMARY

The present disclosure, through one or more of its various aspects, embodiments, and/or specific features or sub-components, provides, inter alia, various systems, servers, devices, methods, media, programs, and platforms for performing an automated scan and validation of a software configuration that is undergoing changes in order to verify that the changes conform to applicable policies, procedures, and rules.

According to an aspect of the present disclosure, a method for validating a configuration of an application is provided. The method is implemented by at least one processor. The method includes: receiving, from a user by the at least one processor, a request for changing a setting of at least one parameter of the configuration of the application, retrieving, from a memory by the at least one processor, a plurality of rules that relate to permissible settings for the at least one parameter, comparing, by the at least one processor, the request to the retrieved plurality of rules; determining, by the at least one processor, whether the request is acceptable based on a result of the comparing; and when the request is determined as being acceptable, validating the request.

When the request is determined as not being acceptable, the method may further include transmitting, to the user, a notification message that includes information relating to a reason that the request is denied.

The plurality of rules may include rules that are applicable across an entirety of a set of applications that are utilized by a commercial organization.

The plurality of rules may include rules that are specific to a particular line of business within a commercial organization.

The plurality of rules may include a first subset of rules that are applicable across an entirety of a set of applications that are utilized by a commercial organization and a second subset of rules that are specific to a particular line of business within the commercial organization.

The at least one parameter may relate to a format of a report generated by executing the application.

The at least one parameter may relate to an element of a displayable digital dashboard generated by executing the application.

The at least one parameter may relate to security information that is usable for authenticating a user request for access to the application.

The at least one parameter may relate to performing a calculation of a value to be included in an output of the application.

The method may further include: receiving, from the user, an input that relates to modifying at least one rule from among the plurality of rules; modifying the at least one rule based on the received input; and determining whether the request is acceptable based on the modified at least one rule.

According to another exemplary embodiment, a computing apparatus for validating a configuration of an application is provided. The computing apparatus includes a processor, a memory, and a communication interface coupled to each of the processor and the memory. The processor is configured to: receive, from a user via the communication interface, a request for changing a setting of at least one parameter of the configuration of the application; retrieve, from the memory, a plurality of rules that relate to permissible settings for the at least one parameter; compare the request to the retrieved plurality of rules; determine whether the request is acceptable based on a result of the comparison, and when the request is determined as being acceptable, validate the request.

When the request is determined as not being acceptable, the processor may be further configured to transmit, to the user via the communication interface, a notification message that includes information relating to a reason that the request is denied.

The plurality of rules may include rules that are applicable across an entirety of a set of applications that are utilized by a commercial organization.

The plurality of rules may include rules that are specific to a particular line of business within a commercial organization.

The plurality of rules may include a first subset of rules that are applicable across an entirety of a set of applications that are utilized by a commercial organization and a second subset of rules that are specific to a particular line of business with the commercial organization.

The at least one parameter may relate to a format of a report generated by executing the application.

The at least one parameter may relate to an element of a displayable digital dashboard generated by executing the application.

The at least one parameter may relate to security information that is usable for authenticating a user request for access to the application.

The at least one parameter may relate to performing a calculation of a value to be included in an output of the application.

The processor may be further configured to: receive, from the user via the communication interface, an input that relates to modifying at least one rule from among the plurality of rules; modify the at least one rule based on the received input; and determine whether the request is acceptable based on the modified at least one rule.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
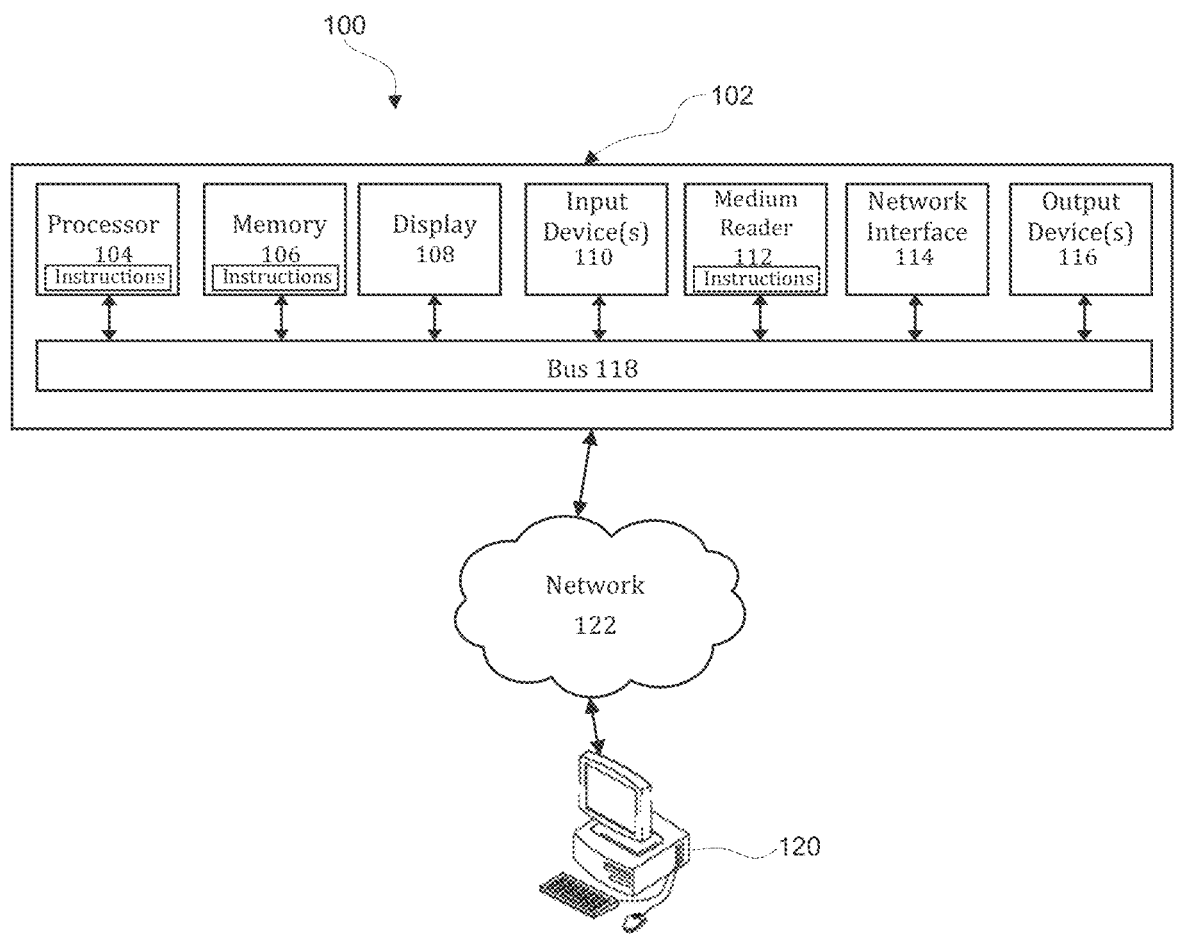
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit ((PU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for performing an automated scan and validation of a software configuration that is undergoing changes in order to verify that the changes conform to applicable policies, procedures, and rules.

Figure 2:
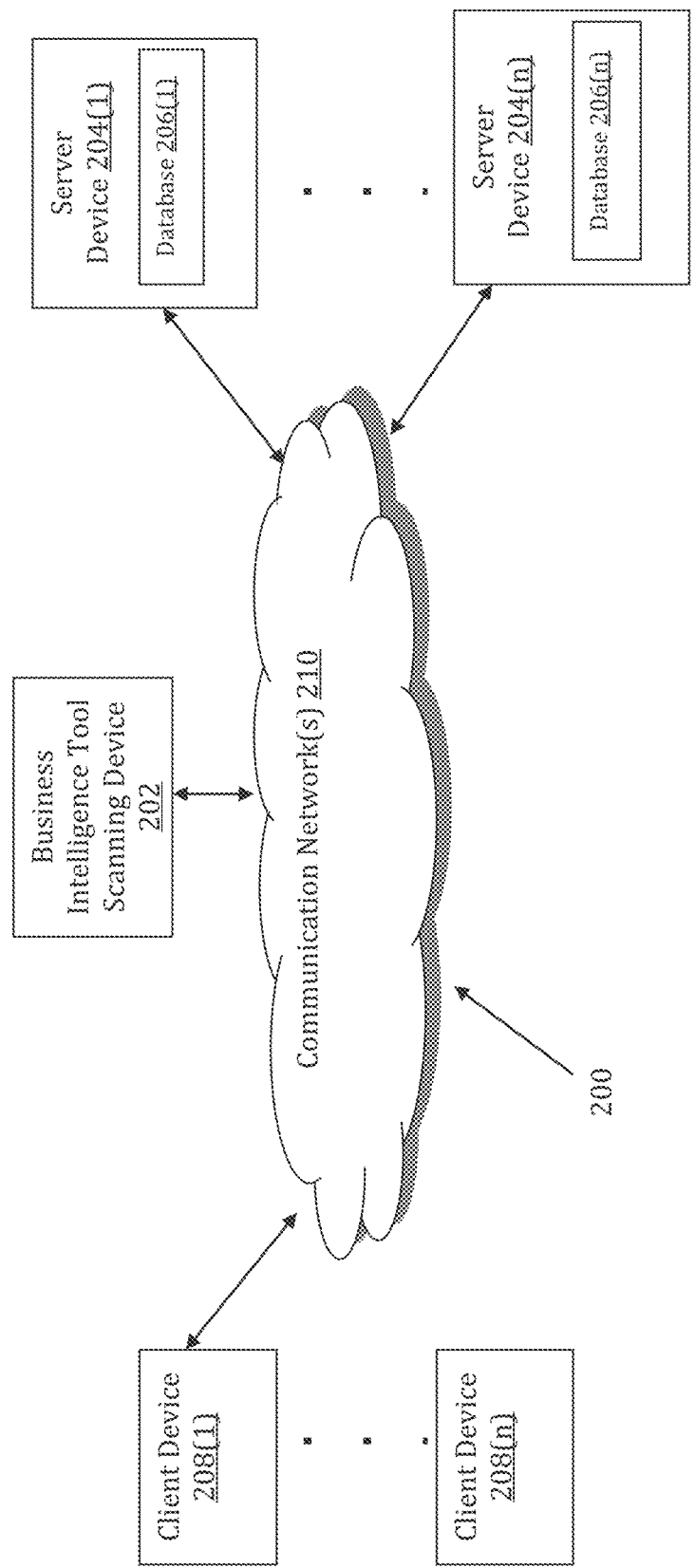
FIG. 2 illustrates an exemplary diagram of a network environment.

Referring to FIG. 2, a schematic of an exemplary network environment 200 for implementing a method for performing an automated scan and validation of a software configuration that is undergoing changes in order to verify that the changes conform to applicable policies, procedures, and rules is illustrated. In an exemplary embodiment, the method is executable on any networked computer platform, such as, for example, a personal computer (PC).

The method for performing an automated scan and validation of a software configuration that is undergoing changes in order to verify that the changes conform to applicable policies, procedures, and rules may be implemented by a Business Intelligence Tool Scanning (BITS) device 202. The BITS device 202 may be the same or similar to the computer system 102 as described with respect to FIG. 1. The BITS device 202 may store one or more applications that can include executable instructions that, when executed by the BITS device 202, cause the BITS device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the BITS device 202 itself, may be located in virtual server(s) running in a cloud-based computing environment rather than being tied to one or more specific physical network computing devices. Also, the application(s) may be running in one or more virtual machines (VMs) executing on the BITS device 202. Additionally, in one or more embodiments of this technology, virtual machine(s) running on the BITS device 202 may be managed or supervised by a hypervisor.

In the network environment 200 of FIG. 2, the BITS device 202 is coupled to a plurality of server devices 204(1)-204(n) that hosts a plurality of databases 206(1)-206 (n), and also to a plurality of client devices 208(1)-208(n) via communication network(s) 210. A communication interface of the BITS device 202, such as the network interface 114 of the computer system 102 of FIG. 1, operatively couples and communicates between the BITS device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the BITS device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and BITS devices that efficiently implement a method for performing an automated scan and validation of a software configuration that is undergoing changes in order to verify that the changes conform to applicable policies, procedures, and rules.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g, voice, modem, and the like), Public Switched Telephone Network (PSTNs), Ethernet-based Packet Data Networks (PDNs), combinations thereof, and the like.

The BITS device 202 may be a standalone device or integrated with one or more other devices or apparatuses, such as one or more of the server devices 204(1)-204(n), for example. In one particular example, the BITS device 202 may include or be hosted by one of the server devices 204(1)-204(n), and other arrangements are also possible. Moreover, one or more of the devices of the BITS device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204 (n) may include, among other features, one or more processors, a memory, and a communication interface, which are coupled together by a bus or other communication link, although other numbers and/or types of network devices may be used. The server devices 204(1)-204(n) in this example may process requests received from the BITS device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206 (n) that are configured to store software configuration change policies, procedures, and rules data and application-specific configuration settings data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204 (1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208 (1)-208(n) in this example may include any type of computing device that can interact with the BITS device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the BITS device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the BITS device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the BITS device 202, the server devices 204(1)-204(n), or the client devices 208(1)-208(n), for example, may be configured to operate as virtual instances on the same physical machine. In other words, one or more of the BITS device 202, the server devices 204(1)-204(n), or the client devices 208(1)-208(n) may operate on the same physical device rather than as separate devices communicating through communication network(s) 210. Additionally, there may be more or fewer BITS devices 202, server devices 204(1)-204(n), or client devices 208(1)-208 (n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
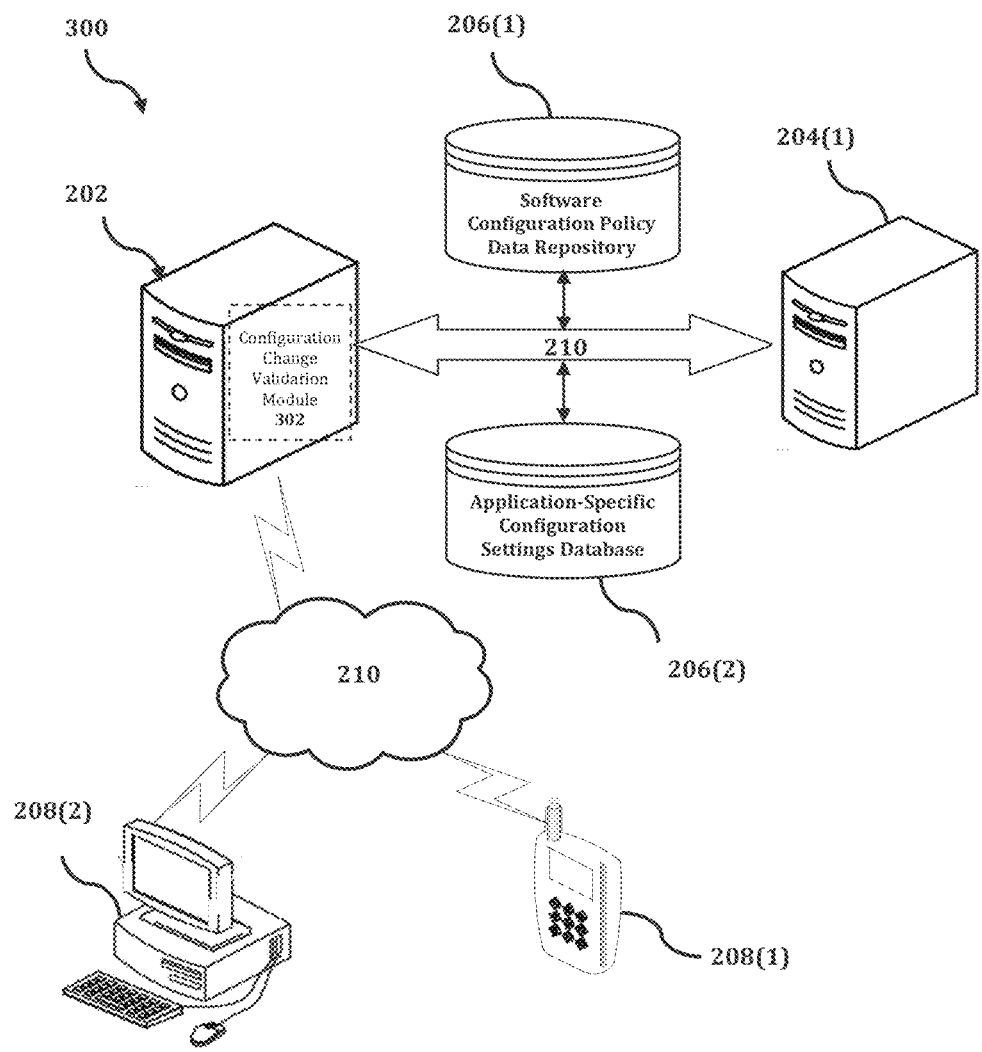
FIG. 3 shows an exemplary system for implementing a method for performing an automated scan and validation of a software configuration that is undergoing changes in order to verify that the changes conform to applicable policies, procedures, and rules.

The BITS device 202 is described and shown in FIG. 3 as including a configuration change validation module 302, although it may include other rules, policies, modules, databases, or applications, for example. As will be described below, the configuration change validation module 302 is configured to implement a method for performing an automated scan and validation of a software configuration that is undergoing changes in order to verify that the changes conform to applicable policies, procedures, and rules in an automated, efficient, scalable, and reliable manner.

An exemplary process 300 for implementing a method for performing an automated scan and validation of a software configuration that is undergoing changes in order to verify that the changes conform to applicable policies, procedures, and rules by utilizing the network environment of FIG. 2 is shown as being executed in FIG. 3. Specifically, a first client device 208(1) and a second client device 208(2) are illustrated as being in communication with BITS device 202. In this regard, the first client device 208(1) and the second client device 208(2) may be "clients" of the BITS device 202 and are described herein as such. Nevertheless, it is to be known and understood that the first client device 208(1) and/or the second client device 208(2) need not necessarily be "clients" of the BITS device 202, or any entity described in association therewith herein. Any additional or alternative relationship may exist between either or both of the first client device 208(1) and the second client device 208(2) and the BITS device 202, or no relationship may exist.

Further, BITS device 202 is illustrated as being able to access a software configuration change policy data repository 206(1) and an application-specific configuration settings database 206(2). The configuration change validation module 302 may be configured to access these databases for implementing a method for performing an automated scan and validation of a software configuration that is undergoing changes in order to verify that the changes conform to applicable policies, procedures, and rules.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the BITS device 202 via broadband or cellular communication. Of course, these embodiments are merely exemplary and are not limiting or exhaustive.

Upon being started, the configuration change validation module 302 executes a process to performing an automated scan and validation of a software configuration that is undergoing changes in order to verify that the changes conform to applicable policies, procedures, and rules. An exemplary process for performing an automated scan and validation of a software configuration that is undergoing changes in order to verify that the changes conform to applicable policies, procedures, and rules is generally indicated at flowchart 400 in FIG. 4.

Figure 4:
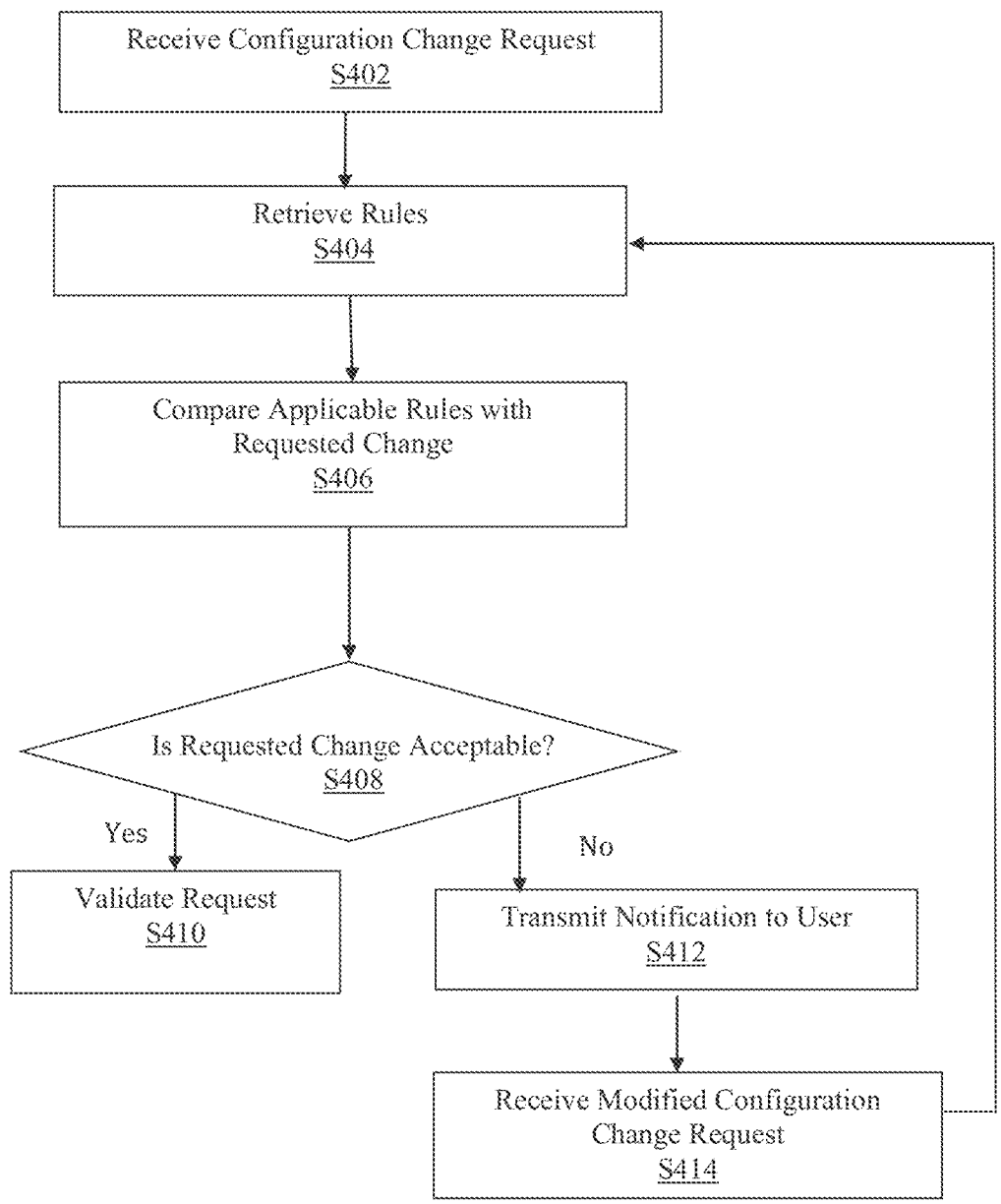
FIG. 4 is a flowchart of an exemplary process for implementing a method for performing an automated scan and validation of a software configuration that is undergoing changes in order to verify that the changes conform to applicable policies, procedures, and rules.

In the process 400 of FIG. 4, at step S402, the configuration change validation module 302 receives, from a user, a request for changing one or more settings of one or more parameters of a configuration of an application. In an exemplary embodiment, when the application is executed, the application may generate a report and/or a digital dashboard that is displayable on a display screen, and the parameters may relate, for example, to any one or more of a format of a report, an element of a report, an element of a digital dashboard. As another example, a parameter may relate to security information that is usable for authenticating a user request for access to the application, such as a password. As yet another example, a parameter may relate to performing a calculation of a value to be included in an output of the application.

At step S404, the configuration change validation module 302 retrieves a set of rules, policies, and procedures from a memory, such as, for example, software configuration policy data repository 206(1). In an exemplary embodiment, the items to be retrieved may include rules, policies, and procedures that are applicable across an entirety of a set of applications that are utilized by a commercial organization; i.e., firm-wide. Alternatively, the items to be retrieved may be applicable to particular line of business within the commercial organization, such as, for example, a legal department, a human resources department, a finance section, a risk assessment section, and/or any other suitable type of group or division within a firm. The items to be retrieved may include a first subset of firm-wide rules and a second subset of rules that are specific to a particular line of business.

At step S406, the configuration change validation module 302 compares the applicable rules from among the items retrieved in step S404 with the configuration change request received in step S402. Then, in step S408, the configuration change validation module 302 determines whether the requested change is acceptable, based on a result of the comparison performed in step S406.

For example, there may be a firm-wide policy that prohibits the inclusion of a hard-coded version of a security password into a database, and so if the configuration change request would enable the inclusion of a security password in a database, then a determination may be made that the request is not acceptable. As another example, there may be a standard procedure that applies to the legal department by which a particular type of report includes a watermark, and so if the configuration change request would effectively delete the watermark, then a determination may be made that the request should be denied. As a third example, there may be a finance section rule by which a digital dashboard that presents a display of certain numerical information is not permitted to include additional calculations of new values, and so if the configuration change request would include a display of a newly calculated value, then a determination may be made that the request is not acceptable.

When a determination is made that the configuration change request is acceptable (i.e., Yes at step S408), then at step S410, the configuration change validation module 302 validates the request. Conversely, when a determination is made that the configuration change request is not acceptable (i.e., No at step S408), then at step S412, the configuration change validation module 302 denies the request and transmits a notification message to the user in order to inform the user that the configuration change request is denied. In an exemplary embodiment, the notification message include explanatory information regarding a reason for the denial, such as, for example, a citation to an applicable rule, policy, or procedure that would be violated if the request had been granted.

In response to receiving the notification message, the user may opt to modify the configuration change request in an attempt to comply with the applicable rules, policies, and procedures, and thus, at step S414, a modified configuration change request may be received by the configuration change validation module 302. Then, the process 400 returns to step S404 in order to assess the acceptability of the modified request.

In an exemplary embodiment, certain rules, policies, and/or procedures may be modifiable. For example, a rule may include configurable settings that may be selectable by authorized personnel. As another example, a user may wish to change a particular policy or procedure based on a business criterion that relates to a particular client. In such a circumstance, a user may provide an input that relates to modifying a rule, a policy, and/or a procedure, such as a new setting for a particular parameter or a policy change request. The configuration change validation module 302 may receive the input and then make a determination as to whether the requested rule change is acceptable. If deemed acceptable, then the rules stored in the software configuration policy data repository 206(1) may be modified based on the received input, and subsequent configuration change requests may be evaluated based on the modified rules.

Accordingly, with this technology, an optimized process for implementing methods and systems for dynamically scanning, filtering, and blocking harmful database queries that would otherwise consume significant resources and adversely impact overall system performance is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects.

Although the invention has been described with reference to particular means, materials and embodiments, the invention is not intended to be limited to the particulars disclosed, rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing. Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description

What is claimed is:

1. A method for validating a configuration of an application, the method being implemented by at least one processor, the method comprising:
    receiving, from a user by the at least one processor, a request for changing a setting of at least one parameter of the configuration of the application;
    retrieving, from a memory by the at least one processor, a plurality of rules that relate to permissible settings for the at least one parameter;
    comparing, by the at least one processor, the request to the retrieved plurality of rules;
    determining, by the at least one processor, whether the request is acceptable based on a result of the comparing; and
    when the request is determined as being acceptable, validating the request,
    wherein when the request is determined as not being acceptable, the method further comprises transmitting, to the user, a notification message that includes information relating to a reason that the request is denied; and
    wherein the at least one parameter relates to a format of a report generated by executing the application.

2. The method of claim 1, wherein the plurality of rules includes rules that are applicable across an entirety of a set of applications that are utilized by a commercial organization.

3. The method of claim 1, wherein the plurality of rules includes rules that are specific to a first line of business within a commercial organization.

4. The method of claim 1, wherein the plurality of rules includes a first subset of rules that are applicable across an entirety of a set of applications that are utilized by a commercial organization and a second subset of rules that are specific to a first line of business within the commercial organization.

5. The method of claim 1, wherein the at least one parameter relates to an element of a displayable digital dashboard generated by executing the application.

6. The method of claim 1, wherein the at least one parameter relates to security information that is usable for authenticating a user request for access to the application.

7. The method of claim 1, wherein the at least one parameter relates to performing a calculation of a value to be included in an output of the application.

8. The method of claim 1, further comprising:
    receiving, from the user, an input that relates to modifying at least one rule from among the plurality of rules;
    modifying the at least one rule based on the received input; and
    determining whether the request is acceptable based on the modified at least one rule.

9. A computing apparatus for validating a configuration of an application, the computing apparatus comprising:
    a processor;
    a memory; and
    a communication interface coupled to each of the processor and the memory,
    wherein the processor is configured to:
        receive, from a user via the communication interface, a request for changing a setting of at least one parameter of the configuration of the application;
        retrieve, from the memory, a plurality of rules that relate to permissible settings for the at least one parameter;
        compare the request to the retrieved plurality of rules;
        determine whether the request is acceptable based on a result of the comparison; and
        when the request is determined as being acceptable, validate the request,
    wherein when the request is determined as not being acceptable, the processor is further configured to transmit, to the user via the communication interface, a notification message that includes information relating to a reason that the request is denied; and
    wherein the at least one parameter relates to an element of a displayable digital dashboard generated by executing the application.

10. The computing apparatus of claim 9, wherein the plurality of rules includes rules that are applicable across an entirety of a set of applications that are utilized by a commercial organization.

11. The computing apparatus of claim 9, wherein the plurality of rules includes rules that are specific to a first line of business within a commercial organization.

12. The computing apparatus of claim 9, wherein the plurality of rules includes a first subset of rules that are applicable across an entirety of a set of applications that are utilized by a commercial organization and a second subset of rules that are specific to a first line of business within the commercial organization.

13. The computing apparatus of claim 9, wherein the at least one parameter relates to a format of a report generated by executing the application.

14. The computing apparatus of claim 9, wherein the at least one parameter relates to security information that is usable for authenticating a user request for access to the application.

15. The computing apparatus of claim 9, wherein the at least one parameter relates to performing a calculation of a value to be included in an output of the application.

16. The computing apparatus of claim 9, wherein the processor is further configured to:
   receive, from the user via the communication interface, an input that relates to modifying at least one rule from among the plurality of rules;
   modify the at least one rule based on the received input; and
   determine whether the request is acceptable based on the modified at least one rule.

\* \* \* \* \*